(12) United States Patent
Gnedin et al.

(10) Patent No.: US 8,343,378 B2
(45) Date of Patent: Jan. 1, 2013

(54) AROMATIC POLYESTERPOLYOLS, ISOCYANURATE-MODIFIED POLYURETHANE FOAMS, AND METHODS OF MAKING THEM

(75) Inventors: Eugen Gnedin, Viersen (DE); Carina Araullo McAdams, Wilmington, NC (US)

(73) Assignee: Invista North America S.A R.L., Wilmington, DE (US)

( * ) Notice: Subject to any disclaimer, the term of this patent is extended or adjusted under 35 U.S.C. 154(b) by 349 days.

(21) Appl. No.: 12/694,306

(22) Filed: Jan. 27, 2010

(65) Prior Publication Data
US 2011/0028581 A1 Feb. 3, 2011

Related U.S. Application Data

(60) Provisional application No. 61/148,536, filed on Jan. 30, 2009.

(51) Int. Cl.
*C09K 3/00* (2006.01)

(52) U.S. Cl. .............................. 252/182.28; 252/182.24

(58) Field of Classification Search ............. 252/182.24, 252/182.28
See application file for complete search history.

(56) References Cited

U.S. PATENT DOCUMENTS

| 3,365,490 A * | 1/1968 | Wilfred et al. ................. 562/529 |
| 3,647,759 A | 3/1972 | Walker |
| 5,660,926 A * | 8/1997 | Skowronski et al. ...... 428/314.4 |
| 6,703,529 B1 * | 3/2004 | Fodor et al. ................... 568/342 |
| 2010/0240913 A1 * | 9/2010 | Pinkos et al. ................. 549/266 |
| 2011/0263907 A1 * | 10/2011 | Abillard et al. ............... 568/852 |

FOREIGN PATENT DOCUMENTS
WO  WO 2009/059913   * 5/2009

OTHER PUBLICATIONS

Ullmann Encyclopedia of Industrial Chemistry, 5th Ed., 1987, vol. A8, p. 49.

* cited by examiner

*Primary Examiner* — John Cooney

(57) ABSTRACT

Embodiments of this disclosure include, among others, polyol mixtures, methods of making a polyol mixture, methods of making a rigid isocyanurate-modified polyurethane foam, rigid isocyanurate-modified polyurethane foams, aromatic polyesterpolyols, and the like.

16 Claims, No Drawings

AROMATIC POLYESTERPOLYOLS, ISOCYANURATE-MODIFIED POLYURETHANE FOAMS, AND METHODS OF MAKING THEM

CROSS-REFERENCE TO RELATED APPLICATION

This application claims priority to U.S. provisional application entitled, "AROMATIC POLYESTERPOLYOLS, ISO-CYANURATE-MODIFIED POLYURETHANE FOAMS, AND METHODS OF MAKING THEM" having Ser. No. 61/148,536, filed on Jan. 30, 2009, which is entirely incorporated herein by reference.

FIELD OF THE INVENTION

The following disclosure relates to aromatic polyesterpolyols and isocyanurate-modified polyurethane (PIR) foams.

BACKGROUND OF THE INVENTION

Rigid isocyanurate-modified polyurethane (PIR) foams are usually prepared by reacting a stoichiometric excess of polyisocyanate with compounds containing an active hydrogen atom (mainly polyfunctional alcohols, so-called polyols (e.g., aromatic polyesterpolyols) in the presence of blowing agents, surfactants, catalysts, and some other additives.

The presence of isocyanurate groups in PIR foams and the high aromaticity of polyesterpolyols provide improved fire retardancy, however, results in processing difficulties due to low compatibility of aromatic polyesterpolyls with blowing agents, specifically hydrocarbons, and to high surface friability, which leads to poor adhesion performance.

Therefore, there is a need to overcome these and/or other deficiencies of current technologies.

SUMMARY OF THE INVENTION

Briefly described, embodiments of this disclosure include, among others, polyol mixtures, methods of making a polyol mixture, methods of making a rigid isocyanurate-modified polyurethane foam, rigid isocyanurate-modified polyurethane foams, aromatic polyesterpolyols, and the like.

One exemplary polyol mixture, among others, includes: an aromatic polyesterpolyol having an aromatic polyester polyol backbone, wherein the aromatic polyesterpolyol has an OHV value of about 30 to 700 mg KOH/g and an average functionality of about 1.5 to 8 mg KOH/g, wherein the aromatic polyester polyol is an esterification/transesterification reaction product of the reaction of: a polyfunctional alcohol; an aromatic polycarboxylic acid component; and a mixture including: hydroxycaproic acid, adipic acid, glutaric acid, 5-hydroxyvaleric acid, 1,2 hexanediol, oxo- and oxa-compounds, oligomeric esters of hydroxycaproic acid and esters of hydroxycaproic acid with adipic acid, and one or more of the following: formic acid, monocarboxylic acid, and diacarboxylic acid.

One exemplary method of making a polyol mixture, among others, includes: an esterification/transesterification reaction product of a reaction of: a polyfunctional alcohol; an aromatic polycarboxylic acid component; and a mixture including: hydroxycaproic acid, adipic acid, glutaric acid, 5-hydroxyvaleric acid, 1,2 hexanediol, oxo- and oxa-compounds, oligomeric esters of hydroxycaproic acid and esters of hydroxycaproic acid with adipic acid, and one or more of the following: formic acid, monocarboxylic acid, and diacarboxylic acid, wherein the product is an aromatic polyester polyol having an aromatic polyester polyol backbone, wherein the aromatic polyol has an OHV value of about 30 to 700 mg KOH/g and an average functionality of about 1.5 to 8 mg KOH/g.

One exemplary method of making a rigid isocyanurate-modified polyurethane foam, among others, includes: providing the aromatic polyesterpolyol, and reacting the aromatic polyesterpolyol with an isocyanate.

One exemplary rigid isocyanurate-modified polyurethane foam, among others, includes: a foam prepared from an aromatic polyesterpolyol having an aromatic polyesterpolyol backbone, wherein the aromatic polyesterpolyol has an OHV value of about 30 to 700 mg KOH/g and an average functionality of about 1.5 to 8 mg KOH/g, wherein the aromatic polyesterpolyol is the esterification/transesterification reaction product of the reaction of: a polyfunctional alcohol; an aromatic polycarboxylic acid component; a mixture including: hydroxycaproic acid, adipic acid, glutaric acid, 5-hydroxyvaleric acid, 1,2 hexanediol, oxo- and oxa-compounds, oligomeric esters of hydroxycaproic acid and esters of hydroxycaproic acid with adipic acid, and one or more of the following: formic acid, monocarboxylic acid, and diacarboxylic acid.

One exemplary aromatic polyesterpolyol, among others, wherein the aromatic polyester polyol has an aromatic polyesterpolyol backbone, wherein the aromatic polyesterpolyol has an OHV value of about 30 to 700 mg KOH/g and an average functionality of about 1.5 to 8 mg KOH/g, wherein the aromatic polyester polyol is an esterification/transesterification reaction product of the reaction of: a polyfunctional alcohol; an aromatic polycarboxylic acid component; and a mixture including: hydroxycaproic acid, adipic acid, glutaric acid, 5-hydroxyvaleric acid, 1,2 hexanediol, oxo- and oxa-compounds, oligomeric esters of hydroxycaproic acid and esters of hydroxycaproic acid with adipic acid, and one or more of the following: formic acid, monocarboxylic acid, and diacarboxylic acid.

DETAILED DESCRIPTION OF THE INVENTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, polymer chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmospheres. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions

A "rigid" foam is a foam that ruptures when a 20×2.5×2.5 cm piece of the foam is wrapped around a 2.5 cm mandrel rotating at a uniform rate of 1 lap per second at 15-25° C.

The term "rigid foam" is used to refer to plastics with a cell structure produced by an expansion process, known as "foaming", and also having a comparatively low weight per unit volume and with low thermal conductivity. Optionally, the foaming process can be carried out substantially simultaneously with the production of the plastic. Such rigid foams are often used as insulators for noise abatement and/or as heat insulators in construction, in cooling and heating technology such as for household appliances, for producing composite materials, such as sandwich elements for roofing and siding, and for wood simulation material, model-making material, and packaging.

The term "hydroxyl value" refers to the concentration of hydroxyl groups, per unit weight of the polyol, that are able to react with the isocyanate groups. The hydroxyl number is reported as mg KOH/g, and is measured according to the standard ASTM D 1638.

The term "acid number" correspondingly indicates the concentration of carboxylic acid groups present in the polyol, and is reported in terms of mg KOH/g and measured according to standard ASTM 4662-98.

The term "average functionality", or "average hydroxyl functionality" of a polyol indicates the number of OH groups per molecule, on average. The average functionality of an isocyanate refers to the number of —NCO groups per molecule, on average.

Discussion

Embodiments of the present disclosure include polyols mixtures, methods of making polyols mixtures, aromatic polyester polyols, methods of making aromatic polyester polyols, rigid isocyanurate-modified polyurethane foams, methods of making a rigid isocyanurate-modified polyurethane foams, methods of making polyols using water wash (aqueous extraction) streams provided by the oxidation of cyclohexane to cyclohexanol and cyclohexanone, polyols made using water wash (aqueous extraction) streams provided by the oxidation of cyclohexane to cyclohexanol and cyclohexanone, and the like.

In an embodiment, aromatic polyesterpolyols are formed using an acid source that is a combination of an aromatic polycarboxylic acid and a water wash stream from the production of adipic acid. In an embodiment, these polyesterpolyols can be used to form rigid isocyanurate-modified polyurethane foams that have good mechanical properties, improved thermal conductivity, and adhesion performance, especially for the foams formed using a hydrocarbon as a blowing agent. In particular, using the water wash stream to form the aromatic polyesterpolyol that are used to form the rigid isocyanurate-modified polyurethane foam results in about 2 to 5% improvement of thermal conductivity of the rigid isocyanurate-modified polyurethane foam.

In an embodiment, the present disclosure provides a polyol mixture and a method of making a polyol mixture. In particular, embodiments of the present disclosure provide for an aromatic polyester polyol and methods of making an aromatic polyester polyol. The polyol mixture can include the aromatic polyester polyol. The aromatic polyester polyol can have an aromatic polyester polyol backbone. In particular, the aromatic polyester polyol backbone can be, for example, esters of aromatic polyfunctional acids such as, but not limited to, isomers of phtalic acid, isomers of trimellitic acid, isomers of diphenyldicarbonic acid, or the combination thereof with aliphatic acids such as, but not limited to, adipic, glutaric, and succinic acids.

In an embodiment, the aromatic polyester polyol can have a hydroxyl value (OHV) of about 30 to 700 mg KOH/g. In an embodiment, the aromatic polyester polyol can have an OHV of about 100 to 300 mg KOH/g. In an embodiment, the aromatic polyester polyol can have an OHV of about 200 to 250 mg KOH/g.

In an embodiment, the aromatic polyester polyol can have an average functionality of about 1.5 to 8 mg KOH/g. In an embodiment, the aromatic polyester polyol can have an average functionality of about 1.8 to 3 mg KOH/g. In an embodiment, the aromatic polyester polyol can have an average functionality of about 2 to 2.5 mg KOH/g.

In an embodiment, the aromatic polyester polyol can have any combination of values for the OHV and the average functionality (e.g., an OHV of about 30 to 700 mg KOH/g and an average functionality of about 2 to 2.5 mg KOH/g or an OHV of about 200 to 250 mg KOH/g and an average functionality of about 1.5 to 8 mg KOH/g).

In an embodiment, the aromatic polyester polyol can have a viscosity of about 500 mPas to 100,000 mPas. In an embodiment the aromatic polyester polyol can have a viscosity of about 1000 mPas to 10,000 mPas. In an embodiment, the aromatic polyester polyol can have a viscosity of about 3000 mPas to 6000 mPas.

In an embodiment, the aromatic polyester polyol can have an acid value of less than 2 mg KOH/g. In an embodiment, the aromatic polyester polyol can have an acid value of less than 1 mg KOH/g.

In an embodiment, the polyol mixture or the aromatic polyester polyol can be prepared by an esterification/transesterification reaction of a mixture of the following components: a polyfunctional alcohol; an aromatic polycarboxylic acid component; and a mixture. The mixture includes hydroxycaproic acid, adipic acid, glutaric acid, 5-hydroxyvaleric acid, 1,2 hexanediol, oxo- and oxa-compounds (e.g., caprolactone), oligomeric esters of hydroxycaproic acid and esters of hydroxycaproic acid with adipic acid, and the mixture can also have one or more of the following: formic acid, monocarboxylic acid, and diacarboxylic acid.

In an embodiment, the polyfunctional alcohol can be about 10 to 90 weight percent of the total reaction composition, the aromatic polycarboxylic acid component can be about 10 to 90 weight percent of the total reaction composition, and the mixture can be about 5 to 50 weight percent of the total reaction composition. In another embodiment, the polyfunctional alcohol can be 20 to 80 weight percent of the total reaction composition, the aromatic polycarboxylic acid component can be about 20 to 60 weight percent of the total reaction composition, and the mixture can be about 5 to 40 weight percent of the total reaction composition. In another embodiment, the polyfunctional alcohol can be 30 to 50 weight percent of the total reaction composition, the aromatic polycarboxylic acid component can be about 30 to 40 weight percent of the total reaction composition, and the mixture can be about 10 to 30 weight percent of the total reaction composition.

In an embodiment the mixture can be composed of about 10 to 40 weight % adipic acid in the mixture, about 1 to 5 weight % glutaric acid in the mixture, about 5 to 15 weight % hydroxycaproic acid in the mixture, about 1 to 10 weight % of 5-hydroxyvaleric acid in the mixture, about 1 to 5 weight % of 1,2-cyclohexanediol in the mixture, less than 5 weight % of oxo- and oxa-compounds in the mixture, about 30 to 60 weight % of oligomeric esters of hydroxycaproic acid and esters of hydroxycaproic acid with adipic acid in the mixture, and less than about 1 weight % of one or more of the following (e.g., each can be about 1 weight % or less or the sum can be about 1 weight % or less) in the mixture: formic acid, monocarboxylic acid, and diacarboxylic acid. In this embodiment, the polyfunctional alcohol can be about 30 to 50 weight % of the total reaction composition, the aromatic polycarboxylic acid component can be about 20 to 45 weight % of the total reaction composition, and the mixture can be about 5 to 40 weight % of the total reaction composition.

In an embodiment, the mixture is from water wash (aqueous extraction) streams from the oxidation of cyclohexane to cyclohexanol and cyclohexanone (cf. Ullmann Encyclopedia of Industrial Chemistry, 5.Ed., 1987, Vol. A8, p. 49). Embodiments of the present disclosure may include a water extraction that may include about 10 to 40 weight % of adipic acid in the water extraction, about 10 to 40 weight % of hydroxycaproic acid in the water extraction, about 1 to 10 weight % of 5-hydroxyvaleric acid in the water extraction, about 1 to 5 weight % of 1,2 cyclohexanediols in the water extraction, up to about 1 weight % of formic acid, and may optionally further include mono-carboxylic (e.g., caproic acid or valeric acid) and dicarboxylic acids (e.g., succinic acid or glutaric acid) in the water extraction, and oxo- and oxa-compounds whose individual content do not exceed about 5 weight % (e.g., acetic, propionic, butyric, oxalic, malonic, and succinic acids) in the water extraction. Additionally, water extraction may contain some oligomeric esters of adipic acid (AA) and hydroxycapronic acid (HYCAP) that can have a molecular weight of about 240-490 (e.g., HYCAP-HYCAP, AA-HYCAP, HYCAP-AA-HYCAP).

In an embodiment, the polyfunctional alcohol can include polyhydric alcohols such as aliphatic, cycloaliphatic, aromatic, and/or heterocyclic polyhydric alcohols. For example, the polyhydric alcohols can include non-alkoxylated glycerol, non-alkoxylated pentaerythritol, non-alkoxylated α-methylglucoside, non-alkoxylated sucrose, non-alkoxylated sorbitol, non-alkoxylated tri-methylolpropane, non-alkoxylated trimethylolethane, tertiary alkynol amines, non-alkoxylated mono-di, tri, and poly saccharides, and combinations thereof. In particular, the polyfunctional alcohol can be one or more of the following: ethylene glycol, diethyleneglycol, triethyleneglycol, polyethylene glycols, propylene glycol, dipropylene glycol, trimethylene glycol, isomers of butanediol, isomers of pentanediol (e.g., 1,5-pentanediol), isomers of hexanediol (e.g., 1,6-hexanediol), isomers of heptanediol (e.g., 1,7-heptanediol), isomers of octanediol, isomers of decandiol, isomers of dodecandiol, isomers of polyglycerol, isomers of trimethylolpropane, isomers of 1,1,1-trimethylolethane, reaction products of pentaerythritol with ethylene- or propyleneoxide, or dipentaerythritol (and reaction products of dipentaerythritol with ethylene- or propyleneoxide), 1,2,6-hexanetriol, and combinations thereof. In an embodiment, the polyfunctional alcohol can be the alkoxylation products of the above mentioned polyfunctional alcohols with ethyleneoxide or propyleneoxide.

In an embodiment, the aromatic polycarboxylic acid component can be one or more of the following: phthalic acid; isophthalic acid; trimellitic acid; terephthalic acid; phthalic acid esters; phthalic acid anhydride; tetrahydrophthalic acid anhydride; pyromellitic dianhydride; tetrachlorophthalic acid anhydride; tetrabromophtalic acid anhydride; and combinations of each.

In an embodiment, one or more of the aromatic polycarboxylic acid components listed above can be used in combination with aliphatic and/or cycloaliphatic acids such as, but not limited to: oxalic acid; malonic acid; succinic acid; glutaric acid; adipic acid; pimelic acid; suberic acid; azelaic acid; sebacic acid; hexahydrophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester, terephthalic acid-bis-glycol ester; and combinations of each.

In an embodiment, derivatives of the aromatic polycarboxylic acids, aliphatic acids, cycloaliphatic acids, and/or the fatty acids, can be used in place of or in combination with the acids. In an embodiment, the derivatives can include anhydrides (some are listed above) and esters, of the acids. In particular, the derivatives of the acids with esters can include esters with low molecular weight alcohols (e.g., methyl-, ethyl-, propyl-/isopropyl-, and butyl-, esters).

The aromatic polycarboxylic acid component can also come from a mixture from a waste or side stream from manufacture of compounds such as, for example, phthalic acid, terephthalic acid, dimethyl terephthalate, polyethylene terephthalate, polybutylene terephthalate, polytrimethylene terephthalate, or adipic acid. In an embodiment, the aromatic polycarboxylic acid component can include ester-containing by-products from the manufacture of dimethyl terephthalate, scrap polyalkylene terephthalates, phthalic anhydride, residues from the manufacture of phthalic anhydride, terephthalic acid, residues from the manufacture of terephthalic acid, isophthalic acid, trimellitic anhydride, residue from the manufacture of trimellitic anhydride, aliphatic polybasic acids or esters derived therefrom, scrap resin from the manufacture of biodegradable, by-products from the manufacture of polyalkylene terephthalate, and combinations thereof. In an embodiment, the aromatic polycarboxylic acid component can be aphthalic acid/esters.

In addition to the polyfunctional alcohol, the aromatic polycarboxylic component, and the mixture, the reaction components can include an oil such as, but not limited to, a natural oil, a natural oil based product, and a combination thereof. In particular, the natural oil can include oil from or derived from rapeseed, soya, coconut, sunflower, palm, tallow, tall oil fatty acid, and the like. The natural oil based products can include, but are not limited to, a fatty acid, a fatty acid derivative like methyl ester, an alcohol, an alcohol derivative, oleyl-, lauryl alcohol, and a combination thereof. In an embodiment, the amount of oil included in the reaction can be about 0 to 50 weight percent of the total reaction components. In an embodiment, the amount of oil included in the reaction can be about 0.1 to 50 weight percent of the total reaction components. In an embodiment, the amount of oil included in the reaction can be about 5 to 20 weight percent of the total reaction components.

As noted above, the esterification/transesterification reaction includes mixing the components and then increasing the temperature from about 145° C.+/−10% to about 235° C.+/−5% with about a 1° C./min+/−1 or 2° and then held at about 235° C.+/−5%, and the reaction is conducted at a normal pressure or weak vacuum of about 10 to 500 mBar. In an embodiment, the esterification/transesterification reaction can include additional components such as, but not limited to, a catalyst, cyclic esters of carbonic acid (e.g., ethylene or propylene carbonate), or a combination thereof. The catalyst can include, but is not limited to, derivatives of titanium, such as esters of titanic acid like tatrapropyl- or bytyl-, titanate, triethanolamine titanate, titanium lactic acid chelate ammonium salt, and the like or derivatives of alkali and earth alkali metals, tin, zinc, lead, zirconium, and the like, or a combination thereof. Esterification/transesterification reaction procedures and conditions for the reaction are known in the art (See, U.S. Pat. No. 3,647,759, which is incorporated herein by reference).

As mentioned above, embodiments of the present disclosure can be directed to rigid isocyanurate-modified polyurethane foams and methods of making rigid isocyanurate-modified polyurethanes. In an embodiment, the rigid isocyanurate-modified polyurethane foam can be made from the polyol mixture or the aromatic polyester polyol. In particular, the aromatic polyester polyol can be reacted with an isocyanate compound. In an embodiment, the aromatic polyester polyol and the isocyanate compound are reacted in the presence of a surfactant and a blowing agent. In addition, other optional components or components can be used such as catalysts, flame retardants, processing aids, frothing agents, viscosity reducers, dispersing agents, plasticizers, pigments, fillers, and combinations thereof, each are known in the art.

The isocyanate compound can include di-isocyanates and isocyanates with more than two isocyanate functionalities. In an embodiment, the isocyanate compound can include organic polyisocyanates such as aromatic that have two or more isocyanate (NCO) groups per molecule. In an embodiment, the isocyanate compound can include 2,4- and 2,6- toluene diisocyanate, 2,4'-, 4,4'- and 2,2-biphenyl diisocyanates, 2,2'-, 2,4'- and 4,4'-diphenylmethane diisocyanates, polymethylenepolyphenylene-polyisocyanates (polymeric MDI), and a combination thereof. In an embodiment, polyisocyanates modified by carbodiimide or isocyanurate groups can also be used. In an embodiment, organic polyisocyanates that are isocyanate terminated prepolymers can be used. In an embodiment, the polyisocyanates are aromatic diisocyanates and aromatic polyisocyanates. In an embodiment, the polyisocyanates include 2,4'-, 2,2'- and 4,4'-diphenylmethane diisocyanate (MDI), polymethylene polyphenylene polyisocyanates (polymeric MDI), and mixtures of the above preferred polyisocyanates.

In an embodiment, the surfactant serves to regulate the cell structure of the foam by helping to control the cell size in the foam and reduce the surface tension during foaming via reaction of the aromatic polyesterpolyol and, optionally, other components, with an organic polyisocyanate. Surfactants such as silicone-polyoxyalkylene block copolymers, non-ionic polyoxyalkylene glycols and their derivatives, and ionic organic salts of these surfactants can be used. In particular, surfactants such as polydimethylsiloxane-polyoxyalkylene block copolymers under the trade names Dabco™ DC-193 and Dabco™ DC-5315 (Air Products and Chemicals, Allentown, Pa.), or Tegostab 88871 (EVON IC) ether sulfates, fatty alcohol sulfates, sarcosinates, amine oxides, sulfonates, amides, sulfo-succinates, sulfonic acids, alkanol amides, ethoxylated fatty alcohol, and nonionics such as polyalkoxylated sorbitan, and a combination thereof, can be used. In an embodiment, the amount of surfactant in the composition can be about 0 wt % to 5 wt %, based on the total weight of the mixture. In an embodiment, the amount of surfactant in the composition can be about 0.1 wt % to 5 wt %, based on the total weight of the mixture. In an embodiment, the amount of surfactant in the composition can be about 1 wt % to 2 wt %, based on the total weight of the mixture.

In an embodiment, the blowing agent can be made from any of the three classes of blowing agents and systems used to make polyurethane and polyisocyanurate foams which are well known in the art: the HCFC/HFC or HCFC/HFC/water co-blown system; a water/hydrocarbon co-blown system; and a water blown system (also referred to in the art as a carbon dioxide blown system since $CO_2$ is derived from the water-isocyanate reaction). In the HCFC/HFC system, a liquid blowing agent is added to a mixture of aromatic polyester-polyol, catalysts, and surfactants prior to adding a polyisocyanate. In the water blown system, water is added and mixed with an aromatic polyester polyol, catalyst, and surfactant mixture prior to adding a polyisocyanate. In the water and hydrocarbon co-blown system, both water and hydrocarbon blowing agents are added to an aromatic polyester polyol, catalyst surfactant premix prior to adding a polyisocyanate. The full-scale production of these components may be metered directly into the mixing head of the foam machine or premixed with an aromatic polyester polyol stream prior to injecting into the mixing head.

In an embodiment, a hydrogen atom-containing blowing agent can be employed to produce the foam compositions. These blowing agents, which can be used alone or as mixtures, can be selected from a broad range of materials, including partially halogenated hydrocarbons, ethers and esters, hydrocarbons, esters, ethers, and the like. In an embodiment, the hydrogen-containing blowing agents are the HCFCs such as 1,1-dichloro-1-fluoroethane, 1,1-dichloro-2,2,2-trifluoroethane, monochlorodifluoromethane, and 1-chloro-1,1-difluoroethane; the HFCs such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1, 3,3,4-hexafluorobutane, 1,1,1,3,3-pentafluorobutane, 1,1,1, 4,4,4-hexafluorobutane, 1,1,1,4,4-pentafluorobutane, 1,1,2, 2,3,3-hexafluoropropane, 1,1,1,2,3,3-hexafluoropropane, 1,1-difluoroethane, 1,1,1,2-tetrafluoroethane, and pentafluoroethane; the HFEs such as methyl-1,1,1-trifluoroethylether and difluoromethyl-1,1,1-trifluoro-ethylether; and the hydrocarbons such as n-pentane, isopentane, and cyclopentane.

A wide variety of co-blowing agents can be employed in conjunction with the hydrogen-containing agents in preparing the foam compositions of the invention. Co-blowing agents can include water, air, nitrogen, carbon dioxide, readily volatile organic substances, and compounds which decompose to liberate gases (e.g., azo compounds). Typical co-blowing agents have a boiling point −50° C. to 100° C., preferably from −50° C. to 50° C. In an embodiment, i-pentane, n-pentane, cyclopentane or combinations is the blowing agent.

In an embodiment, the isocyanurate-modified polyurethane foam can be made by processes and under conditions known in the art.

Embodiments of the isocyanurate-modified polyurethane foam had improved adhesion and processing properties. In particular, the adhesion property improved by more than 100%. In addition, the processing properties improved 5-8% measure as an average flow density in a mould at about 70° C.

EXAMPLES

Test and Analytical Methods

It is convenient, as one skilled in the art would know, to analyze the samples taken intermittently or in the case of final reaction products by chromatographic methods, e.g., GC, GC-MS, HPLC and by spectroscopic methods, e.g., $^1$H NMR and $^{13}$C NMR, and also infrared (IR) methods.

All gas chromatographic (GC) analysis may be performed using an AGILENT TECHNOLOGIES 6890 equipped with AGILENT DB-FFAP column (25 m×0.20 mm×0.3 μm) with injector and detector temperatures kept at 250° C. Such samples are conveniently analyzed using hexadecane as an internal standard at 120° C. isothermal with helium as a carrier gas.

Gas chromatography mass spectrometry (GC-MS) analysis is performed on an AGILENT TECHNOLOGIES 6890 with a Model 5973-MSD (mass-selective detector) equipped with an Agilent DB-FFAP column (25 m×0.20 mm×0.3 μm). The injector and detector temperatures are maintained at 250° C. The samples are analyzed using hexadecane as the internal standard at 120° C. isothermal with helium as the carrier gas.

Proton ($^1$H) NMR and Carbon ($^{13}$C) NMR is done using a Varian 500 MHz NMR equipped with tuning probe. Selective decoupling and homo- and hetero-nuclear NOE experiments may be performed to establish the geometry and positions of oxygen groups in the product.

Pressures reported herein refer to pounds per square inch gauge (psig) which include the pressure of one atmosphere (14.7 pounds per square inch).

Absolute pressures in kilopascals (kPa) are referenced from vacuum. One pound per square inch is about 6.9 kPa.

The "hydroxyl value" (OHV) is measured according to a method according to ASTM D 1638.

The "average functionality" measured according to a method normally calculated based on initial raw materials.

Preparation of the Polyols

Polyols 1 and 2:
Under stirring and nitrogen purging the reaction mixture was heated up from 145° to 235° C. with 1° C./min and kept at 235° C. within 2 hours at about atmospheric pressure.

Polyol 1:
1449.5 g of the Polyol 1 having an OHV of 206.6 mg KOH/g, AV of 0.8 mg KOH/g, and viscosity of 4460 mPas was prepared from the mixture of 599.8 g DEG (34.76%), 282.4 g (16.36%) of water wash stream, available from INVISTA S.à r.l. under the name of Dycal 66, 540.25 g (31.31%) of DMT residue, available from INVISTA S.à r.l. under the name TERATE® 101, 152.1 g (8.82%) of DMT, 101.4 g (5.88%) of tall oil fatty acid, available under the name Bevacid 5 from MEDWESTWACO, 43.3 g (2.51%) propylenecarbonate and 0.65 g (0.038%) of titanium tetrapropylate, available from E. I. du Pont de Nemours and Company under the name TYZOR TPT (CAS Reg. No. 546 68 9).

Polyol 2:
1212.8 g of the Polyol 2 with a OHV of 207 mg KOH/g, viscosity of 6770 mPas and AV of 0.7 mg KOH/g was prepared from the mixture of 470.2 g of DEG (32.27%), 471.9 g (32.35%) of DYCAL 66, 471.3 g (32.35%) of TERATE® 101, 0.76 g (0.052%) of TYZOR TPT and 40.22 g (2.76%) of propylene carbonate.

Polyol 3:
The reaction mixture was heated up from 145 to 230° C. and kept 3 hours at 230° C. The last 2 hours were under a vacuum of about 300 mBar.

1591.8 g polyol with OHV of 194 mg KOH/g, AV of 0.76 mg KOH/g, and viscosity of 6735 at 25° C. was produced from 691.67 g of DEG, 49.26 g pentaerythritol, 501.25 g of terephtalic acid, 481.37 g Dycal 66, 150.18 g TOFA and 0.66 g of TYZOR TPT.

Rigid foams were prepared after the polyesterpolyols were prepared as above and were blended with the traditional ingredients of a PIR foam composition (e.g., catalyst, surfactant, water, flame retardant). The blowing agent used was n-pentane after intensive mixing and reaction with polyisocyanate. The process and conditions for forming the foam are known in the art.

Testing formulation is presented in Table 1

Results from testing these formulations are presented in the Table 2.

TABLE 1

| Component | pph |
|---|---|
| Polyol | 100 |
| TCPP | 13.3 |
| Water | 0.51 |
| NIAX KO | 2.14 |
| Niax KA | 0.61 |
| Tegostab B8871 | 2.00 |
| PMDETA | 0.13 |
| n-Pentane | 18.6 |
| Suprasec 2085 | 164.3 |

TERATE® polyol 3510 is an aromatic polyesterpolyol available from INVISTA S.à r.l. based on DMT residue and DEG.

TERATE® polyol 2540 is an aromatic polyesterpolyol available from INVISTA S.à r.l. based on DMT residue, DMT isomers and DEG and TOFA. TERATE® polyols are available in a wide range of functionalities, hydroxyl levels and viscosities, which allow specific properties to be engineered into products that meet demanding customer and regulatory requirements.

After the foaming process the foams were cured within 2 min at 70° C. in the oven and then were tested for density, facing adhesion, compression strength and thermal conductivity. The last two are presented in the table as an average value from measurements in perpendicular and parallel to the foam rising directions.

The processing performance of the polyols was evaluated as an average density of the foam sample foamed in a horizontal 1500*100*50 mm mould at about 70° C.

TABLE 2

| Polyol | TERATE ® polyol 3510 (reference) | TERATE ® polyol 2540 (reference) | Polyol 1 | Polyol 2 | Polyol 3 |
|---|---|---|---|---|---|
| Reactivity, sec | 24-81-119 | 32-93-102 | 20-79-122 | 23-71-118 | 21-70-85 |
| Density, kg/m³ | 30.67 | 30.11 | 29.9 | 30.5 | 30.6 |
| Facing adhesion to Glass Tissue after curing, kPa | falls down -- failed | falls down -- failed | 109 | 101.6 | 158.7 |
| Average CS, kPa (normalized to 30 kg/m³) | 183.5 | 174.2 | 173.8 | 164.9 | 169.6 |
| Average λ, mW/mK | 23.69 | 23.05 | 22.36 | 23.5 | 22.23 |
| Average flow density in the mould @ 70° C., kg/m³ | 55 | 51 | 47 | 49 | 46 |

The values noted in Table 2 demonstrate that using the water wash stream in the polyol recipe results in sufficient improvement of adhesion performance of PIR foams, without sacrificing other properties. If used with combination with TOFA, Polyol 1 and 3 provides sufficient improvement of thermal conductivity as well. Polyols 1-3 also provide better flow characteristics measure as an average flow density in a mould @ 70° C.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±8%, or ±10%, of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

What is claimed:

1. A polyol mixture comprising:
an aromatic polyesterpolyol having an aromatic polyester polyol backbone, wherein the aromatic polyesterpolyol has a hydroxyl value (OHV) value of about 30 to 700 mg KOH/g and an average functionality of about 1.5 to 8 mg KOH/g, wherein the aromatic polyester polyol is an esterification/transesterification reaction product of the reaction of:
a polyfunctional alcohol;
an aromatic polycarboxylic acid component; and
a mixture including: hydroxycaproic acid, adipic acid, glutaric acid, 5-hydroxyvaleric acid, 1,2-cyclohexanediol, oxo- and oxa-compounds, oligomeric esters of hydroxycaproic acid and esters of hydroxycaproic acid with adipic acid, and the mixture also includes one or more of the following: formic acid, monocarboxylic acid, and diacarboxylic acid.

2. The polyol mixture of claim 1, wherein the mixture includes: about 10 to 40 weight % adipic acid in the mixture, about 1 to 5 weight % glutaric acid in the mixture, about 5 to 15 weight % hydroxycaproic acid in the mixture, about 1 to 10 weight % of 5-hydroxyvaleric acid in the mixture, about 1 to 5 weight % of 1,2 cyclohexanediol in the mixture, less than 5 weight % of oxo- and oxa-compounds in the mixture, about 30 to 60 weight % of oligomeric esters of hydroxycaproic acid and esters of hydroxycaproic acid with adipic acid in the mixture, and less than 1 weight % of one or more of the following in the mixture: formic acid, monocarboxylic acid, and diacarboxylic acid.

3. The polyol mixture of claim 1, wherein the polyfunctional alcohol is selected from the group consisting of: an aliphatic polyhydric alcohol, a cycloaliphatic polyhydric alcohol, an aromatic polyhydric alcohol, a heterocyclic polyhydric alcohol, and a combination thereof.

4. The polyol mixture of claim 1, wherein the polyfunctional alcohol is selected from the group consisting of: non-alkoxylated glycerol, non-alkoxylated pentaerythritol, non-alkoxylated α-methylglucoside, non-alkoxylated sucrose, non-alkoxylated sorbitol, non-alkoxylated tri-methylolpropane, non-alkoxylated, trimethylolethane, tertiary alkynol amines, non-alkoxylated mono-disaccharide, non-alkoxylated mono-trisaccharide, non-alkoxylated mono-poly saccharide, and a combination thereof.

5. The polyol mixture of claim 1, wherein the polyfunctional alcohol is selected from the group consisting of: ethylene glycol, diethyleneglycol, triethyleneglycol, polyethylene glycol, propylene glycol, dipropylene glycol, trimethylene glycol, an isomer of butanediol, an isomer of pentanediol, an isomer of hexanediol, an isomer of heptanediol, an isomer of octanediol, an isomer of decandiol, an isomer of dodecandiol, an isomer of glycerol, an isomer of polyglycerol, an isomer of monomethylolpropane, an isomer of dimethylolpropane, an isomer of trimethylolpropane, an isomer of 1,1,1-trimethylolpropane, an isomer of 1,1,1-trimethylolethane, an isomer of pentaerythritol, one or more reaction products of pentaerythritol with ethylene- or propyleneoxide, dipentaerythritol, one or more reaction products of dipentaerythritol with ethylene- or propyleneoxide, 1,2,6-hexanetriol, α-methyl glucoside, sucrose, sorbitol, and a combination thereof.

6. The polyol mixture of claim 1, wherein the aromatic polycarboxylic acid component is selected from the group or made from the group consisting of: phthalic acid; isophthalic acid; trimellitic acid; terephthalic acid; phthalic acid esters; phthalic acid anhydride; tetrahydrophthalic acid anhydride; pyromellitic dianhydride; tetrachlorophthalic acid anhydride; tetrabromophtalic acid anhydride; and a combination of each.

7. The polyol mixture of claim 1, wherein the polyfunctional alcohol is about 30 to 50 weight % of the reaction product, wherein the aromatic polycarboxylic acid component is about 20 to 45 weight % of the reaction product, and the mixture is about 5 to 40 weight % of the reaction product.

8. The polyol mixture of claim 1, wherein the average functionality is about 1.8 to 3 mg KOH/g.

9. The polyol mixture of claim 1, wherein the average functionality is about 2 to 2.5 mg KOH/g.

10. The polyol mixture of claim 1, wherein the OHV value is about 100 to 300 mg KOH/g.

11. The polyol mixture of claim 1, wherein the OHV value is about 180 to 250 mg KOH/g.

12. The polyol mixture of claim 1, wherein the reaction further comprises an oil selected from the group consisting of: a natural oil, a natural oil based product, and a combination thereof.

13. The polyol mixture of claim 12, wherein the natural oil based product is selected from the group consisting of: oil from or derived from rapeseed, soya, coconut, sunflower, palm, tallow, tall oil fatty acid, and a combination thereof.

14. The polyol mixture of claim 1, wherein the aromatic polyester polyol backbone is selected from the group consisting of an ester of an aromatic polyfunctional acid.

15. An aromatic polyesterpolyol, wherein the aromatic polyester polyol has an aromatic polyesterpolyol backbone, wherein the aromatic polyesterpolyol has a hydroxyl value (OHV) of about 30 to 700 mg KOH/g and an average functionality of about 1.5 to 8 mg KOH/g, wherein the aromatic polyester polyol is an esterification/transesterification reaction product of the reaction of:
    a polyfunctional alcohol;
    an aromatic polycarboxylic acid component; and
    a mixture including: hydroxycaproic acid, adipic acid, glutaric acid, 5-hydroxyvaleric acid, 1,2-cyclohexanediol, oxo- and oxa-compounds, oligomeric esters of hydroxycaproic acid and esters of hydroxycaproic acid with adipic acid, and one or more of the following: formic acid, monocarboxylic acid, and diacarboxylic acid.

16. The aromatic polyesterpolyol of claim 15, wherein the mixture includes: about 10 to 40 weight % adipic acid in the mixture, about 1 to 5 weight % glutaric acid in the mixture, about 5 to 15 weight % hydroxycaproic acid in the mixture, about 1 to 10 weight % of 5-hydroxyvaleric acid in the mixture, about 1 to 5 weight % of 1,2 cyclohexanediol in the mixture, less than 5 weight % of oxo- and oxa-compounds in the mixture, about 30 to 60 weight % of oligomeric esters of hydroxycaproic acid and esters of hydroxycaproic acid with adipic acid in the mixture, and less than 1 weight % of one or more of the following in the mixture: formic acid, monocarboxylic acid, and diacarboxylic acid.

* * * * *